(No Model.)  H. C. BROOKENS.  3 Sheets—Sheet 1.
LAND PULVERIZER.

No. 518,363.  Patented Apr. 17, 1894.

FIG.I.

Witnesses.  Inventor
Jas. K. McCathran  Harry C. Brookens
W. S. Duvall  By his Attorneys,
C. A. Snow & Co.

(No Model.) 3 Sheets—Sheet 2.

H. C. BROOKENS.
LAND PULVERIZER.

No. 518,363. Patented Apr. 17, 1894.

Witnesses:
Jas. K. McCathran
W. T. Duvall

Inventor
Harry C. Brookens
By his Attorneys,
C. A. Snow & Co.

(No Model.) 3 Sheets—Sheet 3.

H. C. BROOKENS.
LAND PULVERIZER.

No. 518,363. Patented Apr. 17, 1894.

Witnesses:
Jas. K. McCathran
W. F. Duvall

Inventor:
Harry C. Brookens
By his Attorneys.
C. A. Snow & Co.

UNITED STATES PATENT OFFICE.

HARRY CLYDE BROOKENS, OF BLOOMINGTON, WISCONSIN, ASSIGNOR OF ONE-HALF TO T. S. BROOKENS, OF SAME PLACE.

LAND-PULVERIZER.

SPECIFICATION forming part of Letters Patent No. 518,363, dated April 17, 1894.

Application filed May 31, 1893. Serial No. 476,139. (No model.)

*To all whom it may concern:*

Be it known that I, HARRY CLYDE BROOKENS, a citizen of the United States, residing at Bloomington, in the county of Grant and State of Wisconsin, have invented a new and useful Land-Pulverizer, of which the following is a specification.

My invention relates to improvements in agricultural implements or machines, and especially to that class thereof designed for the pulverization of land preparatory to planting therein.

The objects in view are to produce a machine, not complex in its construction nor costly in its manufacture, but which by its peculiar arrangement and combination of parts may be produced at a reasonable cost, and which is calculated thoroughly and efficiently to pulverize to a desired depth the soil subjected to its operation; so to construct the machine as to have all of the parts under the ready control of the operator, whereby the pulverizers may be depressed or raised so as to pulverize more or less deeply or be elevated wholly above the soil out of contact therewith; whereby also the parts may be thrown out of operative position, so that the machine may be transported to and from the field of operation.

With these and other objects too numerous to mention in view the invention consists in certain features of construction hereinafter specified and particularly pointed out in the claims.

Figure 1:
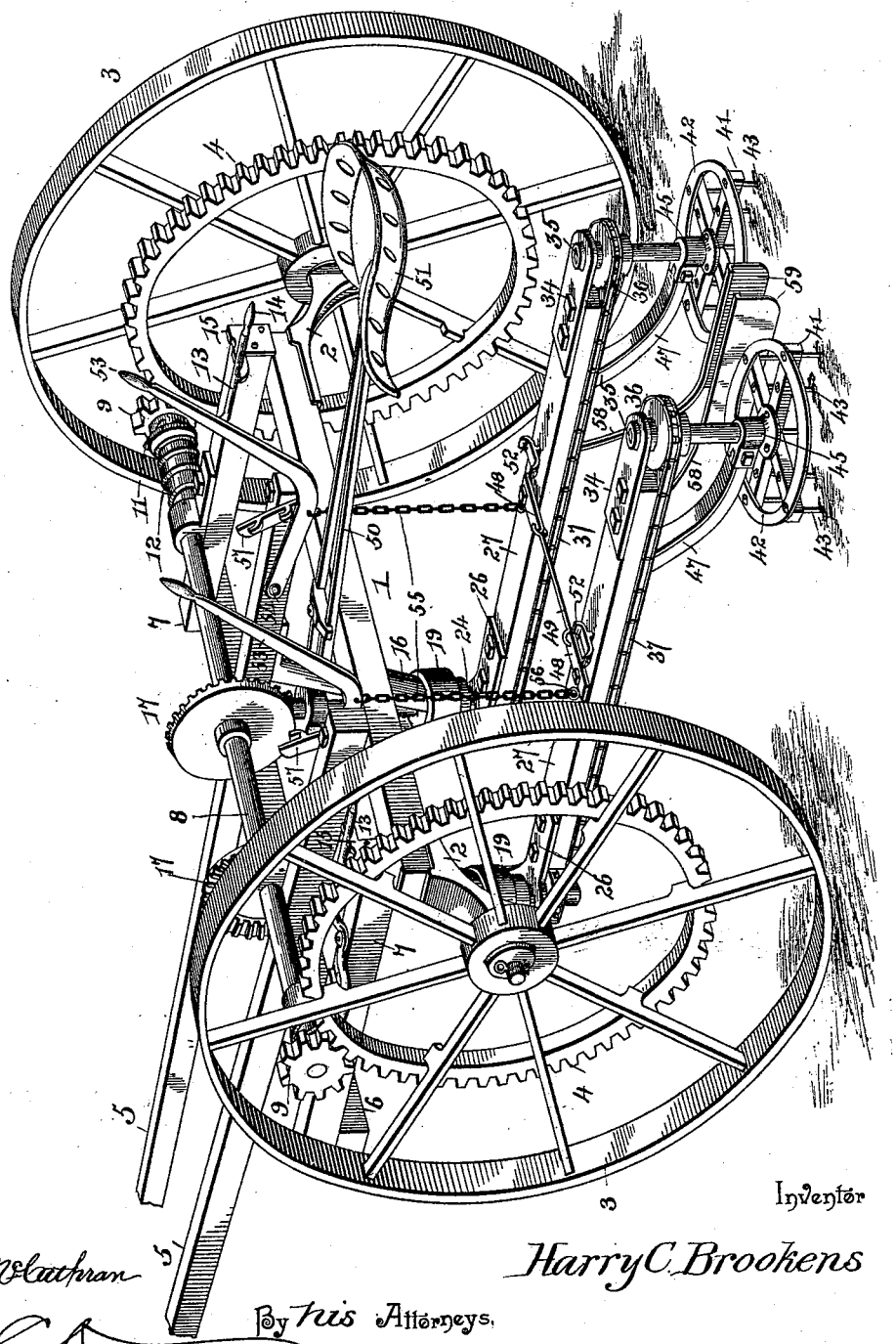
Figure 2:
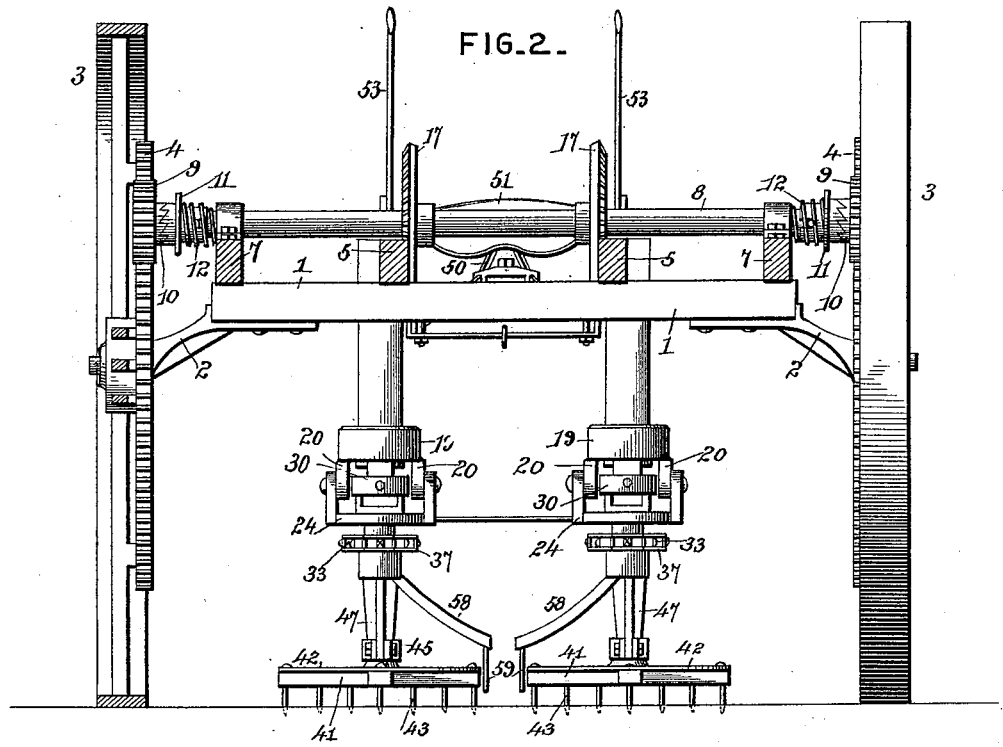
Figure 3:
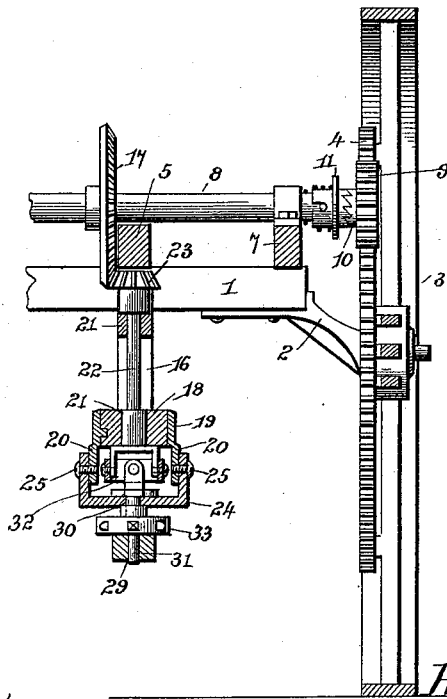
Figure 4:
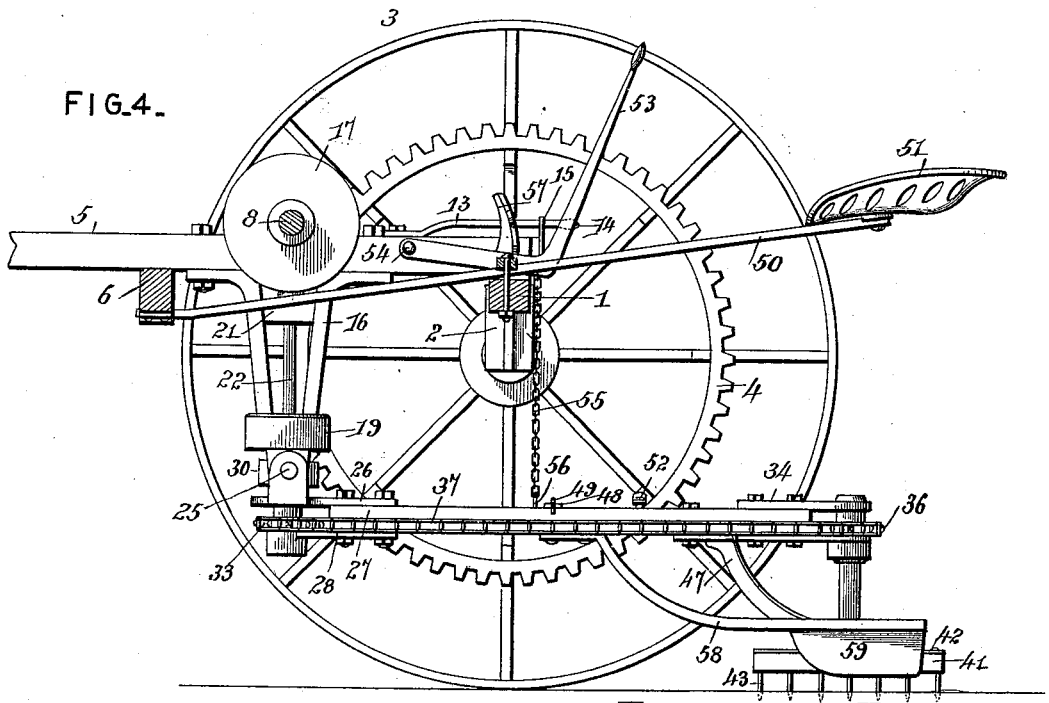
Figure 5:
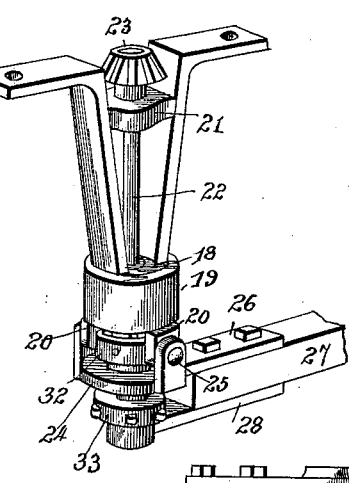
Figure 6:
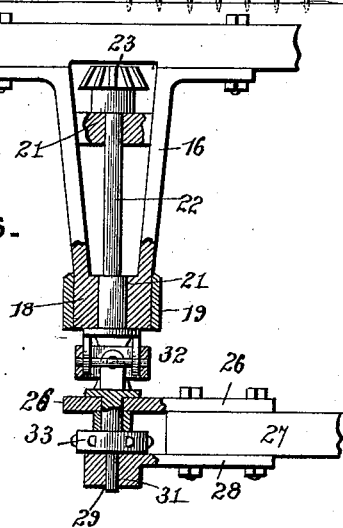
Figure 7:
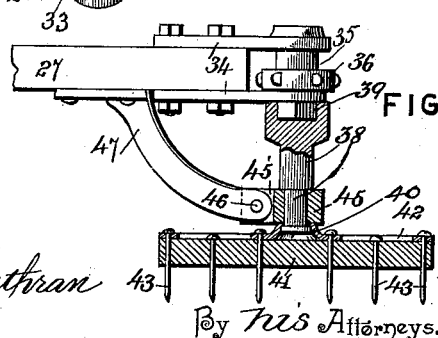

Referring to the drawings: Figure 1 is a perspective view of a machine embodying my invention, the view being taken from the rear. Fig. 2 is a front elevation thereof. Fig. 3 is a transverse vertical sectional view through the vertical standards by which the pulverizer beams are supported. Fig. 4 is a vertical longitudinal sectional view of the machine. Fig. 5 is a detail in perspective of one of the hanging standards. Fig. 6 is a longitudinal sectional view thereof, and of a portion of the beam. Fig. 7 is a detail in section of the rear end of the beam and one of the pulverizer wheels.

Like numerals of reference indicate like parts in all the figures of the drawings.

The axle is arched slightly, as shown, in that in the present instance it consists of a central transverse tree 1 having the end castings 2 in which the ends of said tree are securely bolted, the castings being provided with stub bearings for the reception of the ground-wheels 3. These ground-wheels are of the ordinary construction and have secured to their spokes large master gears 4. Surmounting the axle are the branches 5 of the draft-tongue, whose rear end is bolted to the tree; and, bolted to the under side of the draft tongue, and extending at a right angle thereto, is the transverse frame-bar 6 whose ends are connected by the longitudinally disposed opposite side bars 7, likewise bolted at their ends to the tree and to the cross-bar.

A pair of transverse opposite bearings are located upon the side bars intermediate their ends, and journaled for rotation in said bearings is a transverse shaft 8, whose ends project beyond the side-bars to points opposite the master gears where they carry small gears 9. The small gears 9 are loose upon the shaft and are provided at their inner sides with ratchet toothed hubs 10. At the inner sides of the toothed hubs upon this shaft there are splined toothed clutch-sleeves 11, between which and the bearings in which the shaft is mounted coiled springs 12 are interposed. A curved lever 13 is fulcrumed upon each of the side-bars and at their front ends engage with the clutch-sleeves so that by an oscillation of the levers the clutch-sleeves may be thrown into and out of operative connection with the hubs of the small gear wheels. The rear ends of the levers are shaped to form convenient handles 14 and may be secured in either of their positions through the medium of notched locking plates 15 secured to the rear ends of the side-bars. In this manner it will be seen that the shaft may be made to rotate or remain idle during the travel of the machine.

Securely bolted to the under sides of the branches of the tongue between the front cross-bar and the axle is a pair of depending hanger standards 16, and at the inner sides of said standards the transverse shaft before mentioned has mounted thereon beveled gears 17. The hanger standards are cylindrical at their lower ends and are provided with an angular shoulder 18, and upon the shoulder of each hanger standard a loose collar 19 is swiveled, each of said collars having formed at diametrically opposite sides, pendent bearing ears 20. The standards are provided with upper and lower bearings 21, and short vertical shafts 22 are journaled in the bearings. These shafts are provided above their upper bearings with miter gears 23 which engage with the beveled gears carried by the transverse shaft.

U-shaped brackets 24 are through the medium of pivotal bolts 25 loosely connected to the pendent ears of the swiveled collars and said brackets are provided with rearwardly disposed securing plates 26, to which are bolted the front ends of a pair of rearwardly disposed horizontally and vertically adjustable drag beams 27. Each of the beams has secured to its under side and at its front end a plate 28 which extends beyond said front end and is provided at its front extremity with a bearing perforation 29, which aligns vertically with a corresponding opening or bearing 30 formed at the center of the U-shaped bracket immediately above. In these two latter bearings short shafts 31 are journaled, and the same are connected to the lower ends of the miter gear carrying vertical shafts through the medium of gimbal or universal joints 32, which are located between said brackets and the lower ends of the pendent standards. The shafts are further provided between the brackets and the plates below the same with sprocket-wheels 33, whose functions will hereinafter appear.

In bearing plates 34 located upon the upper and lower sides of each of the beams there are journaled short vertical pulverizer shafts 35, and between each plate each shaft carries a sprocket wheel 36, the same being operated through the medium of chain-belts 37 and the sprocket wheels 33. The lower ends of the pulverizer shafts have fitted thereover loose sleeves 38, the said sleeves being rectangular in cross-section at their upper ends, as indicated at 39, for the purpose of fitting the shafts, which are also of similar shape at these points. The lower end of each sleeve terminates in a hub 40, each of the sleeves carrying and having secured to its under side one or more radial arms 41, whose outer ends are connected by rings 42. These arms are provided with depending spikes or harrow teeth 43, which are designed to be rapidly carried through the soil during the rotations of the pulverizer wheels thus constructed for the purpose of thoroughly and efficiently pulverizing the soil and carrying therefrom all undergrowth that would otherwise choke or impede the growth of the plant to be grown. Each sleeve carries a loose collar 45 provided with a pair of bearing ears 45', and the same are perforated for the accommodation of transverse wooden locking pins 46. These locking pins pass through the lower perforated ends of supporting arms 47 which depend from the lower sides of the beams. If at any time the pulverizers should meet with an obstruction, it will be seen that the wooden pins will break, and there being nothing left to retain the sleeves upon the shafts, the former will drop from their shafts. It will be seen that the collars support the sleeves upon the shafts, which collars are in turn supported by the transverse break-pins mentioned.

Eyes 48 are formed upon the beams, and the latter are connected by means of the spacing-rod 49 whose ends are bent loosely to engage the eyes and thus retain or space the beams in proper relative position.

A pair of bracket-arms 50 extend from the under side of the front cross-bar of the frame over the axle and support a seat 51 for the driver, he being located directly over the pulverizers, and for the accommodation of his feet I provide rests 52 upon the upper sides of the beams. It will be seen that by exerting more or less strength or weight upon these beams the driver may regulate the depth of penetration into the soil of the pulverizers. A pair of bell-crank levers 53 are fulcrumed at their front ends, as at 54, to the inner sides of the branches of the draft-tongue, and draft chains 55 depend loosely from the angles of the levers to eyes 56 extending from the upper sides of the beams, the aforesaid levers terminating at their upper ends in suitable handles within grasp of the operator and are designed for locking in notched locking plates 57, which are secured to the inner sides of the branches of the tongue.

By reason of the swiveled and pivotal connection of the front ends of the drag-beams 27 with the lower ends of the depending hanger-standards 16, means are provided whereby the said drag-beams can be adjusted vertically, either singly or together, while at the same time they are permitted a horizontal or lateral play between the opposite ground wheels 3. When the operator or driver places his feet upon the rests 52, he may not only regulate the depth of penetration for the pulverizers, but may simultaneously shift the drag-beams, carrying such pulverizers, horizontally or laterally, so that a wide area of ground may be made to come under the action of the pulverizers and thereby greatly increase the usefulness or capacity of the machine. The loose connection of the spacing rod 49 with each of the beams 27, provides means whereby the said beams are moved simultaneously in their horizontal adjustment, while at the same time allowing a separate vertical adjustment for each drag-beam independently of the other, as the requirements of the particular portion of ground being pulverized may demand, and these several adjustments of the drag-beams do not interfere with the rotation of the pulverizers on account of the universal connection or joint 32 between the short shafts 31 and the vertical drive shafts 22.

In ordinary spring and fall pulverization of the soil it will be seen that the machine as at present described is extremely useful and efficient. The ground-wheels rotating transmit their motion to the cross shaft through the medium of the master-gears, and said cross-shaft through the vertical shafts and gimbal joints transmit motion to the shorter shafts arranged below the same. Sprocket wheels and chains serve to transmit the motion from thence to the pulverization shafts, which operating the sleeves also rotates rapidly the pulverizers, their motion being accelerated by the difference in gearing between the parts. As before stated if at any time a serious obstruction should be met with by either of the pulverizer wheels the break-pin will become broken and thus the sleeves and pulverizers carried thereby being no longer supported by the bearing collar will fall from the shafts to the ground.

As shown in the drawings I may secure to the under sides of the two beams curved arms 58, which extend inward between the pulverizers and are provided with fenders 59. The machine when thus provided is adapted to cultivate at opposite sides of young corn, the fenders being of such length it being understood as will permit the pulverizers to throw toward the corn row a suitable quantity of the loose soil. The fenders are detachable and may or may not be used according to the use to which the machine is put.

The operation of the machine whether with or without the fenders is precisely the same, and I do not limit my invention to the employment of the fenders, as the same are only employed under certain conditions; nor do I limit the invention to the various details of construction herein shown and described, but hold that I may vary the same to any degree and extent within the knowledge of the skilled mechanic without departing from the spirit of my invention or sacrificing any of the inherent advantages thereof.

Having described my invention, what I claim is—

1. In a pulverizer, the combination with the framework, the axle, and the ground-wheels, of a pair of beams extending rearward and suspended from the framework, vertical shafts journaled in bearings in the rear ends of the beams, sleeves mounted removably upon and adapted to revolve with the shafts, rotary pulverizers carried by said sleeves, bearing collars supporting the sleeves upon the shafts, bracket-arms depending from the beams, break-pins securing the bracket arms to the bearing collars, and means for communicating motion from the ground-wheels to said shafts, substantially as specified.

2. In a pulverizer, the combination with the framework, the axle, and the ground-wheels, of a pair of beams extending rearward and depending from said framework, straps having bearings secured upon the upper and lower sides of and extending rearward from the ends of the beams, vertical shafts journaled in the straps and provided with squared portions, gear wheels mounted upon the shafts between the straps, gearing for communicating motion from the ground-wheels to said shafts, sleeves loosely mounted upon the shafts below the straps and having upper squared portions fitting the shafts, rotary pulverizers carried by the lower ends of the sleeves, shoulders formed upon the sleeves, bearing collars located under the shoulders of the sleeves and supporting the same and provided with perforated ears, bracket-arms depending from the beams and taking between said ears, and break-pins located in the perforations of the ears and rear ends of the bracket-arms, substantially as specified.

3. In a pulverizer, the combination with the framework, the ground wheels, and the axle for the same; of standards depending from the framework and terminating at their lower ends in bearings, beams loosely hung at the lower ends of the standards for vertical and horizontal adjustment, means for raising and lowering the beams, vertical shafts journaled in the standards, others journaled in the rear ends of the beams, pulverizers carried by the latter shafts, and means for communicating motion from the ground wheels to the shafts of the standards and from thence to the pulverizer carrying shaft, substantially as set forth.

4. In a pulverizer, the combination with the framework, the ground-wheels, and axle, of standards depending from the framework, shafts located in the standards and terminating at their upper ends in gears, means for communicating motion to said gears from the ground-wheels, a pair of beams loosely hung to the lower ends of and extending rearward from the standards, short shafts located in the front ends of said beams, a gimbal joint connection between the lower ends of the shafts in the standard and said short shafts, sprocket wheels carried by said short shafts, rear vertical pulverizer carrying shafts, sprocket wheels carried thereby, and sprocket chains connecting the said sprocket shafts with those of the short shafts, substantially as specified.

5. In a pulverizer, the combination with the framework, the axle, the ground-wheels, standards depending from the framework and provided with upper and lower bearings, vertical shafts mounted in said bearings, gears carried by the upper ends of the shafts, means for communicating motion to said gears from the ground wheels, a pair of beams universally hung to the lower ends of the standards, bearings formed at the front and rear ends of said beams, short shafts arranged in the front bearings, a gimbal joint connection between the upper ends of said short shafts and the lower ends of the shafts of the beams, sprocket wheels carried by said short shafts, pulverizer carrying shafts supported in the rear bearings, sprocket wheels carried thereby, and sprocket chains connecting the sprocket wheels of the two shafts at the front and rear ends of the beams, substantially as specified.

6. In a pulverizer, the combination with the framework, the ground wheels and their axles, of a pair of rearwardly disposed beams loosely suspended from said frame work and having a lateral play, rotary pulverizers mounted at the rear ends of the beams, means for communicating motion from the ground wheels to said pulverizers, fenders extending down and rearward from the beams between the pulverizers, and a spacing rod loosely connected at its ends to said beams, substantially as set forth.

7. In a land pulverizer, the combination with a wheeled frame, of loosely connected horizontal drag beams loosely suspended from said frame and having a simultaneous horizontal or lateral adjustment and an independent vertical adjustment, rotary pulverizers mounted at the rear ends of each beam, and means for transmitting motion to such pulverizers from the wheels of the frame, substantially as set forth.

8. In a land pulverizer, the combination with the wheeled frame, of depending hanger-standards attached to the frame, vertical shafts journaled in said hangers and suitably geared with the ground wheels, horizontally and vertically adjustable drag-beams swiveled and pivotally connected at their forward ends to said hanger standards, shafts journaled in each end of said beams of which the forward ones are connected to said vertical shafts by a universal joint, pulverizers attached to the shafts at the rear ends of the beams, and a drive connection between the shafts at the ends of the beams, substantially as set forth.

In testimony that I claim the foregoing as my own I have hereto affixed my signature in the presence of two witnesses.

HARRY CLYDE BROOKENS.

Witnesses:
P. BARTLEY,
T. S. BROOKENS.